(12) United States Patent
Malavasi

(10) Patent No.: US 9,599,252 B2
(45) Date of Patent: Mar. 21, 2017

(54) ENERGY RECOVERING FLOW CONTROL VALVE

(71) Applicant: POLITECNICO DI MILANO, Milan (MI) (IT)

(72) Inventor: Stefano Malavasi, Buccinasco (IT)

(73) Assignee: Politecnico di Milano, Milan (IT)

( * ) Notice: Subject to any disclaimer, the term of this patent is extended or adjusted under 35 U.S.C. 154(b) by 102 days.

(21) Appl. No.: 14/376,113

(22) PCT Filed: Feb. 14, 2013

(86) PCT No.: PCT/IB2013/051202
§ 371 (c)(1),
(2) Date: Jul. 31, 2014

(87) PCT Pub. No.: WO2013/121375
PCT Pub. Date: Aug. 22, 2013

(65) Prior Publication Data
US 2015/0041002 A1    Feb. 12, 2015

(30) Foreign Application Priority Data
Feb. 16, 2012    (IT) .............................. MI2012A0234

(51) Int. Cl.
*F16K 47/04*    (2006.01)
*F16K 5/06*    (2006.01)

(52) U.S. Cl.
CPC .......... *F16K 47/045* (2013.01); *F16K 5/0605* (2013.01); *Y10T 137/8376* (2015.04)

(58) Field of Classification Search
CPC ...... F16K 47/00; F16K 47/045; F16K 5/0605; Y10T 137/8376
(Continued)

(56) References Cited

U.S. PATENT DOCUMENTS 2,209,397 A    7/1940  Gannestad
3,352,155 A    11/1967 Penet
(Continued)

FOREIGN PATENT DOCUMENTS

CN    1353800 A    6/2002
CN    1542314 A    11/2004
(Continued)

OTHER PUBLICATIONS

International Preliminary Report on Patentability dated Aug. 19, 2014, issued in PCT Application No. PCT/IB2013/051202, filed Feb. 14, 2013.
(Continued)

*Primary Examiner* — Marina Tietjen
(74) *Attorney, Agent, or Firm* — Workman Nydegger

(57)    ABSTRACT

A fluid flow control valve (101, 601) includes a housing (106) and a spherical obstructer (107) having a through hole (108), wherein the spherical obstructer (107) is inserted in the housing (106) and is adapted to rotate therein (106) about an axis of rotation (110) between a first position, in which the through hole (108) is substantially coaxial to the control valve to allow the passage of a fluid, and a second position, in which the through hole (108) is substantially transversal to the control valve to prevent the passage of a fluid. The control valve further includes a rotor (111) within the through hole (108), wherein the rotor is adapted to rotate in a continuous manner under the action of a fluid flowing through the control valve, rotating about a second axis of rotation (112) substantially coinciding with the axis of rotation of the spherical obstructer.

11 Claims, 4 Drawing Sheets

(58) Field of Classification Search
USPC ........................................ 137/15.17, 551, 798
See application file for complete search history.

(56) References Cited

U.S. PATENT DOCUMENTS

| | | | |
|---|---|---|---|
| 3,522,929 A | | 8/1970 | De Simone |
| 3,568,716 A | | 3/1971 | Heitzman |
| 4,230,154 A | | 10/1980 | Kalbfleish |
| 4,541,450 A | * | 9/1985 | Bron ................ A01C 23/042 137/101.31 |
| 5,511,584 A | * | 4/1996 | Leinen ................ F16K 5/0605 137/625.3 |
| 6,029,702 A | * | 2/2000 | Leinen ................ F16K 5/0605 137/625.32 |
| 6,520,209 B1 | | 2/2003 | Lundqvist |
| 7,044,436 B2 | | 5/2006 | Corbetta et al. |
| 7,768,146 B2 | * | 8/2010 | Balzano ................ F03B 13/00 290/43 |
| 2,015,861 A1 | | 10/2014 | Mitereff |
| 2009/0165866 A1 | | 7/2009 | Fima |

FOREIGN PATENT DOCUMENTS

| | | | | |
|---|---|---|---|---|
| CN | 201777597 U | | 3/2011 | |
| CN | 102072334 A | | 5/2011 | |
| DE | 14 98 431 A1 | | 2/1969 | |
| EP | 2 085 753 A1 | | 8/2009 | |
| EP | 2 090 812 A1 | | 8/2009 | |
| FR | 1 498 325 | | 4/1966 | |
| FR | 2 488 364 A1 | | 2/1982 | |
| GB | 2 113 353 A | | 8/1983 | |
| IT | EP 2740978 A1 | * | 6/2014 | .......... F16K 5/0605 |
| JP | 2006-517273 A | | 7/2006 | |
| WO | 2004/070169 A1 | | 8/2004 | |
| WO | 2007/023217 A1 | | 3/2007 | |
| WO | 2010/117839 A1 | | 10/2010 | |

OTHER PUBLICATIONS

International Search Report dated Jun. 11, 2013, issued in PCT Application No. PCT/IB2013/051202, filed Feb. 14, 2013.
Italian Search Report dated Sep. 13, 2012, issued in Italian Application No. MI20120234, filed Feb. 16, 2012.
Chinese Office Action dated Aug. 19, 2015, issued in Chinese Application No. 201380009563.0.

* cited by examiner

ENERGY RECOVERING FLOW CONTROL VALVE

FIELD OF THE INVENTION

The present invention relates to a fluid flow control valve, in particular a control valve that allows recovering a part of the energy of the fluid flowing through the valve itself.

PRIOR ART

Devices called "ball valves" are currently known which are used as shut-off devices in pipes, typically pressurized ones.

Ball valves allow to selectively close the pipe with which they are associated, so as to prevent a fluid, such as gas, liquid or steam, from flowing therein. For this purpose, the ball valves known in the art comprise an obstructer with a substantially spherical shape, housed in a suitable seat and having a substantially cylindrical through hole.

The spherical obstructer of a ball valve can be oriented with its through hole coaxial to the flow, thus allowing the fluid to flow through the valve; the spherical obstructer can also be oriented perpendicularly to the direction coaxial to the pipe, thus substantially preventing the fluid from flowing through the valve. The spherical obstructer of a ball valve can be selectively rotated, typically by an angle between 0° and 90°, by means of a suitable actuator, such as a knob operable by a user.

Known ball valves are mostly used as on/off devices, wherein the pipe is selectively opened or closed completely, so as to allow or prevent the flow through the valve.

The ball valves known in the art, however, also allow adjusting the fluid flow in a pipe wherein the valve has been inserted, by rotating the obstructer by an angle smaller than 90°, so as to obstruct only a part of the free cross-section of the pipe. In this manner, the flow through the ball valve is reduced, but not completely prevented.

The flow adjustment effectiveness of known ball valves is nevertheless poor. In the first place, the adjustment of the flow through the valve is inaccurate, and it is difficult to precisely determine the quantity of gas or liquid actually flowing through a partially closed ball valve.

In the second place, a known ball valve, when partially closed in order to adjust the flow of a fluid, introduces huge local dissipations in the fluid itself. Such dissipations lead to a reduction in the average velocity of the fluid, and hence to a reduced flow rate, but they typically represent no energetic benefit for the system in which the ball valve is included.

OBJECTS AND SUMMARY OF THE INVENTION

It is one object of the present invention to provide a ball-type fluid flow control valve which is improved over the prior art.

In particular, it is one object of the present invention to provide a control valve wherein it is possible to recover, at least partly, the energy of the fluid dissipated while adjusting the fluid flow through the valve.

It is another object of the present invention to provide a control valve that allows for a more accurate adjustment of the fluid flow through the valve, in particular also when the ball valve is only partially closed.

It is a further object of the present invention to provide a ball-type control valve having a simple construction and compact dimensions, comparable to those of known ball valves.

These and other objects of the present invention are achieved through a control valve incorporating the features set out in the appended claims, which are intended to be an integral part of the present description.

The general idea at the basis of the present invention is to provide a fluid flow control valve which comprises a housing and a spherical obstructer comprising a through hole, wherein the spherical obstructer is inserted in the housing and is adapted to rotate therein about an axis of rotation between a first position, in which the through hole is substantially coaxial to the control valve to allow the passage of a fluid, and a second position, in which the through hole is substantially transversal to the control valve to prevent the passage of a fluid. The control valve further comprises a rotor within said through hole, wherein said rotor is adapted to rotate in a continuous manner under the action of a fluid flowing through the valve, rotating about a second axis of rotation substantially coinciding with the axis of rotation of the spherical obstructer.

The control valve according to the present invention therefore allows to recover at least a part of the energy dissipated by the fluid flowing through the valve; at the same time, the valve proves to be more effective in adjusting the flow of a fluid through the valve itself, thereby allowing to reduce the average velocity of the fluid by a desired quantity under the action of the rotor. The energy recovered will be a function of the valve opening degree, i.e. the angle of rotation of the obstructer, and also of the rotor's efficiency.

The control valve according to the present invention also allows to effectively exploit the rotor for all angles of rotation of the obstructer at which the fluid can pass through the valve itself, i.e. the optimal operation of the rotor is not only ensured within a subset of configurations of the obstructer.

In addition, the adoption of a rotor with an axis of rotation transversal to the fluid flow improves the effectiveness of the rotor itself and of the adjustment, allowing to vary the dissipations introduced in the fluid even by simply changing the moment of resistance applicable to the rotor.

Furthermore, since the axis of rotation of the rotor coincides with the axis of rotation of the obstructer, the introduction of the rotor requires no substantial modifications to the structure or to the principle of operation of the ball valve, while at the same time allowing to obtain a compact device which is easy to manufacture.

Preferably, the rotor comprises a shaft and a plurality of blades which are substantially transversal to the fluid flow and which are secured to the shaft. In this way, a highly efficient rotor of simple construction can be obtained.

Preferably, the blades are twisted in a direction substantially parallel to the fluid flow through the valve, thus further improving the efficiency of the rotor and facilitating the starting thereof.

Preferably, the blades are sized such as to occupy, for some rotation positions of the rotor, substantially the whole free cross-section of the hole of the spherical obstructer.

Preferably, the blades comprise holes on their surface in order to decrease the dissipations occurring in the fluid flowing across the rotor and to improve flow control accuracy.

Preferably, the control valve comprises a deflecting element positioned upstream of said rotor and adapted to fluid-dynamically interact with the fluid flow, so as to improve the efficiency of the rotor and facilitate the starting thereof.

Preferably, the deflecting element is positioned asymmetrically in the valve, at a cross-section defined by the axis of rotation of the valve.

Preferably, the valve can be associated with a mechanical unit or an electric generator, in order to transform the rotation of the rotor into usable energy. Thus, the valve can make available a source of mechanic or electric energy even in remote or hardly accessible places, or anyway it can provide electric energy in places where there are no electric mains cables.

Further objects and advantages of the present invention will become more apparent from the following detailed description.

BRIEF DESCRIPTION OF THE DRAWINGS

Some preferred and advantageous examples of embodiment of the present invention will now be described by way of non-limiting example with reference to the annexed drawings, wherein the same reference numerals are used to designate similar components, materials or functions, and wherein.

DETAILED DESCRIPTION OF THE INVENTION

Figure 1:
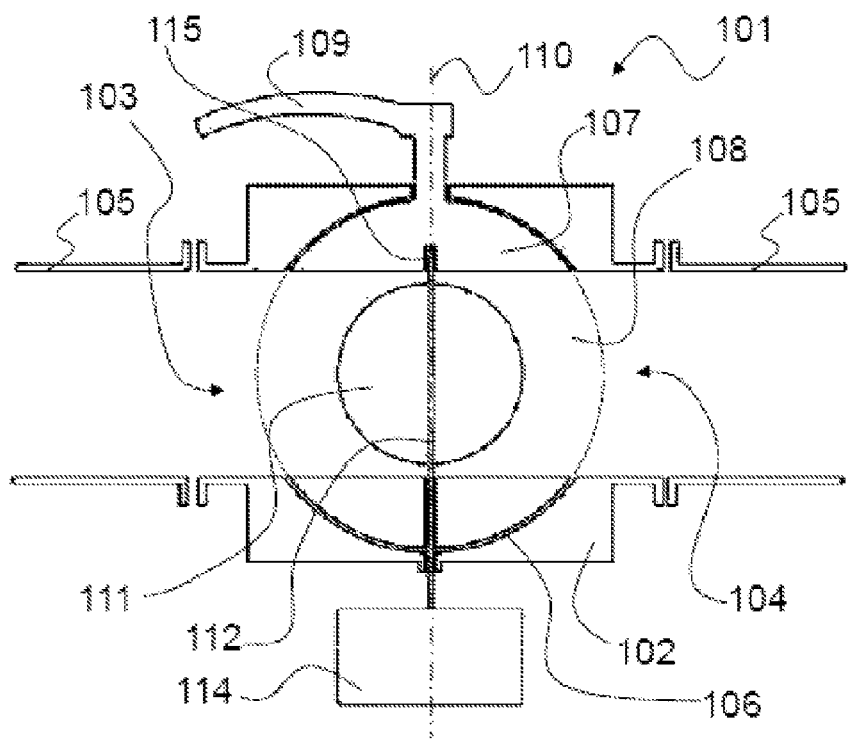
FIG. 1 schematically shows an embodiment of the valve according to the present invention, combined with a user apparatus and a mechanical actuator.

FIG. 1 is a diagrammatic view of a valve 101 according to the present invention. The valve 101 comprises a body 102 with an inlet 103 and an outlet 104, which allow a fluid to flow through the valve 101. In operating conditions, the valve 101 can be mounted to a pipe 105 of a pressurized system.

The valve 101 comprises components that make it essentially a "ball" valve; in fact, it comprises a substantially spherical housing 106 that accommodates an obstructer 107, which allows closing the valve 101 in order to stop the fluid flow from the inlet 103 to the outlet 104.

The obstructer 107 has a substantially spherical shape and comprises a through hole 108, the axis of which can be rotated in different positions. To this end, the obstructer 107 is connected to a mechanical actuator 109, e.g. a knob operable by a user, or a pneumatic or electromechanical actuator, and can be rotated to align the through hole 108 with the axis of the valve 101 (thus allowing the passage of fluid) or to move the through hole 108 in a position substantially transversal to the axis of the valve 101 (thus substantially preventing the passage of fluid).

The coupling between the housing 106 and the spherical obstructer 107 is such as to ensure tightness when the obstructer is in the closed position, whether the fluid is a liquid, gas, steam or any other multi-phase fluid; to ensure such tightness, known elements and techniques can be used.

The obstructer 107 is thus adapted to rotate about the axis 110; the valve 101 further comprises a rotor 111 inserted in the through hole 108 and secured to a shaft 112, on which it is adapted to rotate in a continuous manner. The shaft 112 is coaxial, or at least substantially coaxial, to the axis 110, so that the spherical obstructer 107 can be turned in order to close the valve 101 without jeopardizing the operation of the rotor 111. The rotor 111, in fact, is adapted to rotate under the action of the fluid flowing through the valve 101, according to modes that will be described more in detail below.

The shaft 112 has one end protruding from the spherical obstructer 107 and, in the non-limiting example of FIG. 1, also from the body of the valve 101. The protruding end of the shaft 112 is mechanically connected, or directly connected in the example of FIG. 1, to a user apparatus 114. The user apparatus 114 is adapted to use the mechanical power supplied by the shaft 112 due to the rotation of the rotor 111. In this example, the actuator 109 is positioned at the axis 110 on the side of the valve 101 opposite to the user apparatus 114.

The user apparatus 114 may be an electric generator or a mechanical unit, such as, for example, a fan. The user apparatus 114 may further comprise known transmission couplings or reducers, not shown for the sake of simplicity.

Figure 2:
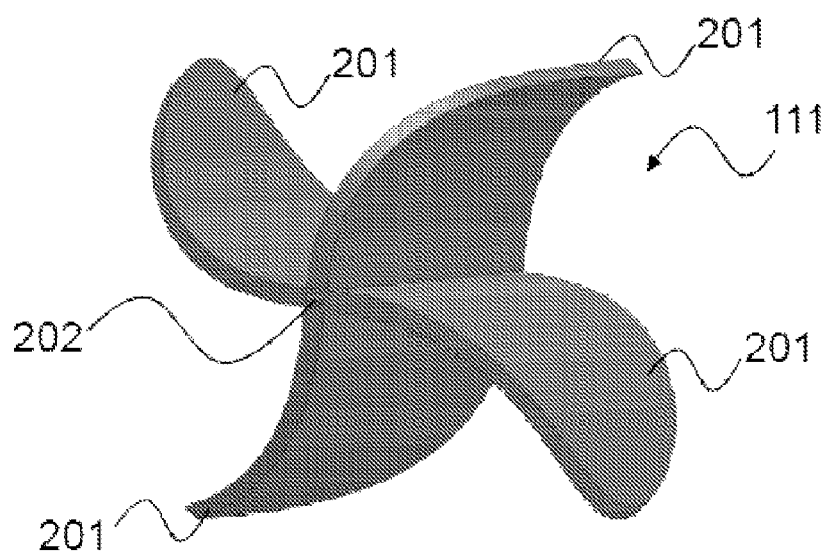
FIG. 2 shows a first embodiment of a rotor of a control valve according to the present invention.

FIG. 2 illustrates a preferred embodiment of the rotor 111 to be mounted to the shaft 112. The rotor 111 comprises four blades 201 which, under the action of the fluid flow passing through the valve 101, are adapted to rotate and produce a torque that drives the shaft 111.

In one embodiment, the rotor 111 comprises a through hole 202 along the axis of the rotor 111. Into this hole 202, which preferably has a cross-like cross-section, the shaft 112 can be inserted, which preferably has one end hinged into a cavity 115 (see FIG. 1) of the spherical obstructer 107 and the other end projecting out of the valve 101 and connected to the above-described user apparatus 114.

In general, particular attention must be paid to the making of the hole through the obstructer 107, into which the shaft 112 is to be inserted, because, while on the one hand a perfect seal is required in order to prevent any fluid leakage, at the same time the sealing system must not hinder too much the rotation of the shaft 112 by introducing excessive friction. As far as construction materials are concerned, the criteria of good engineering practice shall be adopted, by using known metal alloys typically employed for common control valves, and by taking into account the operating pressures and temperatures involved, the aggressiveness of the working environment, and the corrosiveness of the fluid.

It must be pointed out that a valve according to the present invention can be obtained by conversion of a known ball valve, by adding thereto components such as the rotor 111, the shaft 112 and the user apparatus 114 after appropriate mechanical machining. In particular, the example of embodiment of the rotor 111 provided herein with reference to FIG. 2 (i.e. wherein he shaft 112 is separated from the rotor 111) is particularly advantageous in view of converting a ball valve, since the rotor 111 is adapted to be freely inserted into the through hole 108, so that the shaft 112 can be subsequently inserted into the hole of the spherical obstructer 107 along the axis 110, thus connecting the rotor 111 to the shaft 112 via the profiled hole 202.

Figure 3:
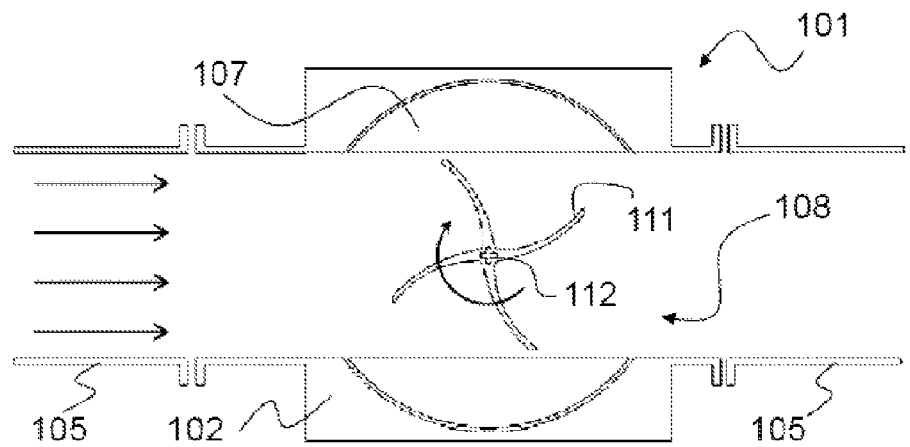
FIGS. 3, 4 and 5 schematically show a sectional side view of the valve of FIG. 1, respectively for three different angles of rotation of the spherical obstructer.

FIG. 3 schematically shows a side view of the valve 101 in the operating condition.

The valve 101 is shown herein in the fully open configuration, wherein the axis of the through hole 108 s coaxial to the axis of the valve 101, thus allowing the fluid to pass.

Under the action of the passing fluid (schematized in the drawing and hereafter as partial flow lines), the rotor 111 rotates in a continuous manner, thereby rotating the shaft 112. It must also be pointed out that the valve 101 allows the fluid flow to be adjusted by changing a resistant torque applicable to the shaft 112, so as to introduce additional losses in the fluid and reduce the average velocity, and hence the flow rate, thereof.

Figure 4:
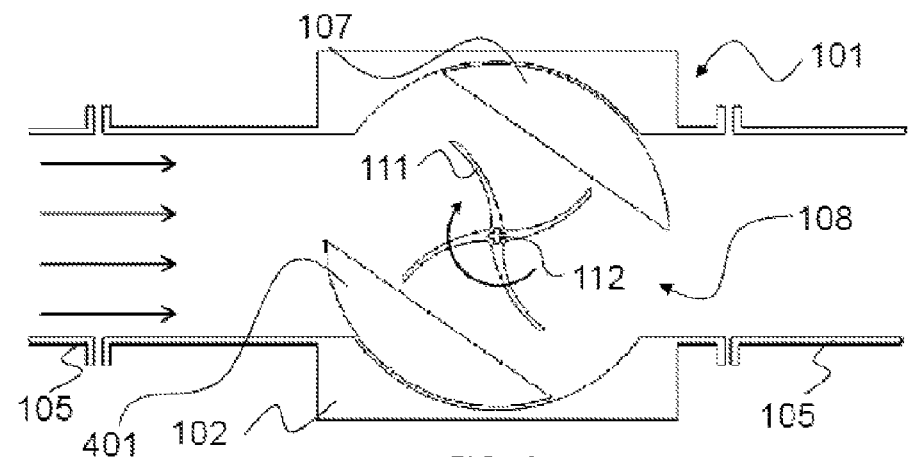

FIG. 4 schematically shows a side view of the valve 101 in a different operating condition. The valve 101 is shown herein in a partially open configuration, wherein the axis of the through hole 108 has been turned relative to the axis of the valve 101 following a rotation of the obstructer 107, thus still allowing the fluid to pass, but at a lower flow rate. In fact, the edge 401 of the obstructer 107 is incident on the fluid flow, thereby introducing a load loss that reduces the fluid flow through the valve 101.

However, the rotor 111 will still rotate under the action of the passing fluid. Even with the valve partially closed, therefore, power recovery is still possible thanks to the torque provided by the shaft 112. Moreover, by adjusting the resistant torque of the rotor 111 it is possible to improve the fluid flow adjustment even further.

Preferably, the blades of the rotor 111 are twisted in a direction substantially parallel to the fluid flow through the valve 101; furthermore, the blades of the rotor 111 are preferably sized such as to occupy, for at least some rotation positions of the rotor 111 within the through hole 108, substantially the whole free cross-section of the hole 108.

Figure 5:
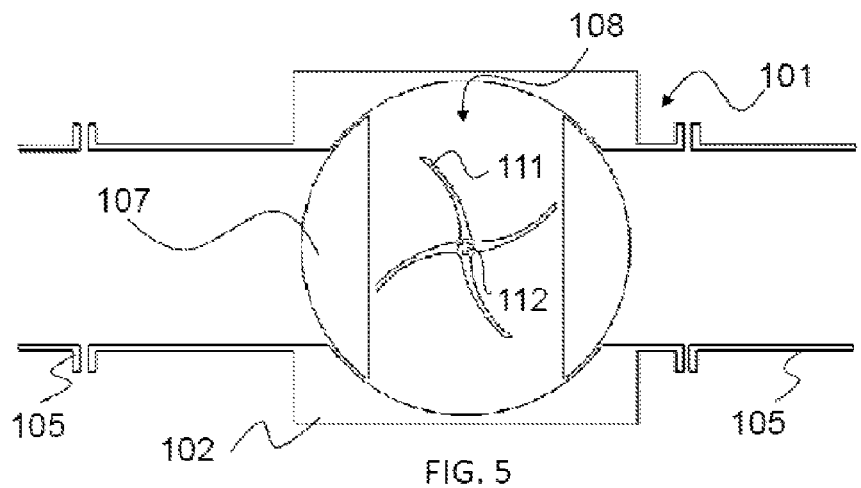

FIG. 5 schematically shows a side view of the valve 101, in yet another operating condition. The valve 101 is shown herein in the closed configuration, wherein the axis of the through hole 108 has been turned by 90° relative to the axis of the valve 101 following a rotation of the obstructer 107, thus substantially preventing the fluid from passing through the valve. Since no fluid can flow around the rotor 111, the latter will remain still and no power will be generated. In this configuration, the valve 101 allows closing the pipe 105, thus effectively performing this task much like prior-art ball valves. In this regard, the presence of the rotor 111 does not in the least affect the outer dimensions or the performance of the valve 101.

Figure 6:
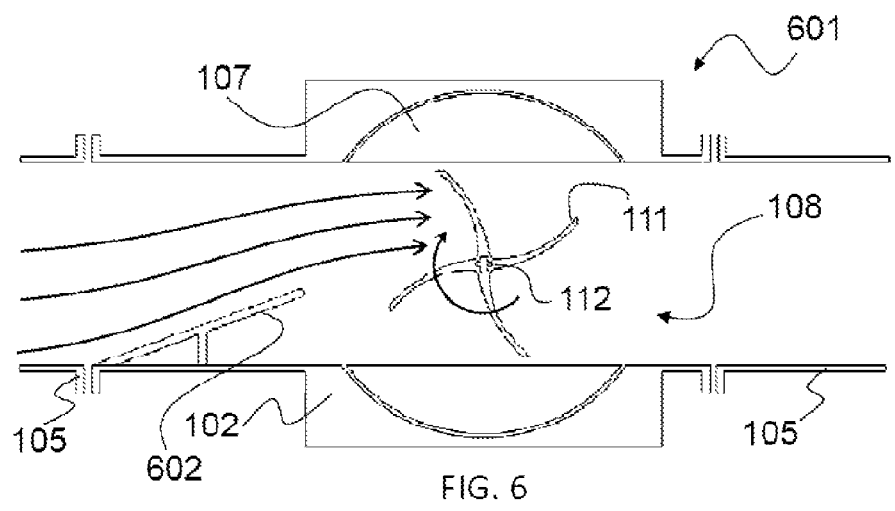
FIGS. 6, 7 and 8 schematically show a sectional side view of a second embodiment of a control valve according to the present invention, respectively for three different angles of rotation of the spherical obstructer.

FIG. 6 schematically shows a further embodiment of a valve 601 according to the present invention. The valve 601 comprises elements similar to those of the valve 101 described so far, with the addition of a deflector 602 positioned at the inlet of the valve 601, i.e. upstream of the rotor 111 with respect to the direction of the fluid flow.

The deflector 602 allows to improve the efficiency of the rotor 111 by directing the fluid flow towards the upper blades of the rotor 112, which are therefore subjected to a greater thrust.

The deflector 602 may be a simple plate anchored and welded to a support, or it may have more aero-fluid-dynamically efficient shapes to avoid vein breaking.

Preferably, the deflector 602 is placed in a position, in the valve cross-section. such that it is asymmetrical relative to the axis of rotation of the rotor 111, i.e. in an asymmetric position in the cross-section of the valve 601 with respect to the shaft 112.

The deflector 602 also allows the rotor 111 to be more easily set in motion when the valve 602 is opened partially, by asymmetrically directing the fluid towards a blade of the rotor 111, thereby facilitating the starting thereof.

Figure 7:
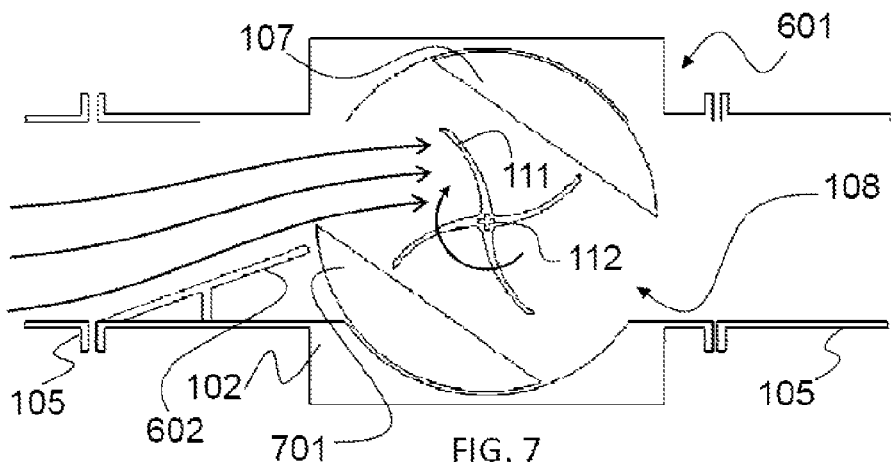

FIG. 7 schematically shows a side view of the valve 601 in a partially open configuration, wherein the axis of the through hole 108 has been turned relative to the axis of the valve 601 following a rotation of the obstructer 107.

The fluid is thus allowed to flow through the valve 601, and the deflector 602 contributes to preventing any dissipations concentrated at the edge 701 of the obstructer 107, which is incident on the fluid flow. Thus, by controlling in a more effective manner the load losses that reduce the fluid flow through the valve 601, it is possible to further improve the adjustment of the fluid flow.

Again, the rotor 111 is made to turn under the action of the passing fluid, thereby allowing to recover, and then use, power generated by the torque provided by the shaft 112, also for the purpose of further improving the control of the fluid flow.

Figure 8:
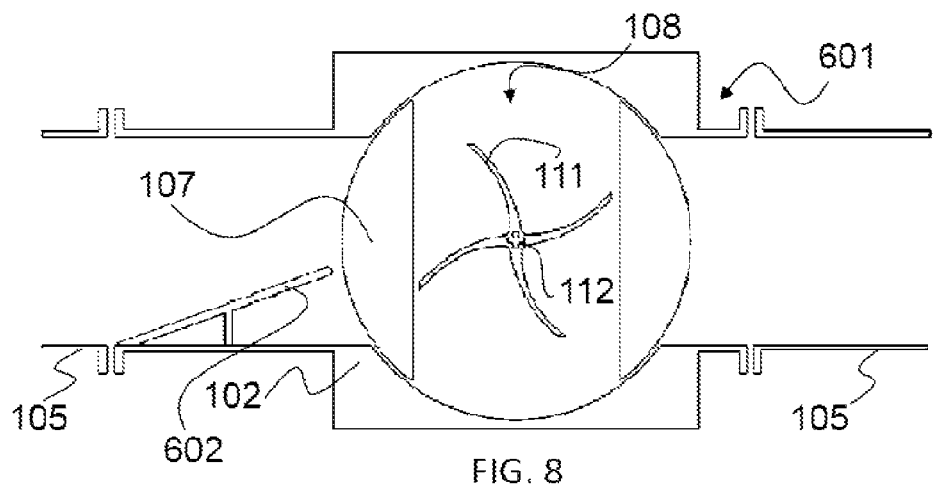

FIG. 8 schematically shows a side view of the valve 601 in the closed configuration, wherein the axis of the through hole 108 has been turned by 90° relative to the axis of the valve 601, thus substantially preventing the fluid from flowing through the valve.

Since no fluid can flow around the rotor 111, the latter will remain still and no power will be generated. In this configuration as well, the valve 601 allows closing the pipe 105, thus effectively performing this task much like prior-art ball valves, without the presence of the deflector 602 adversely affecting the valve's performance.

Figure 9:
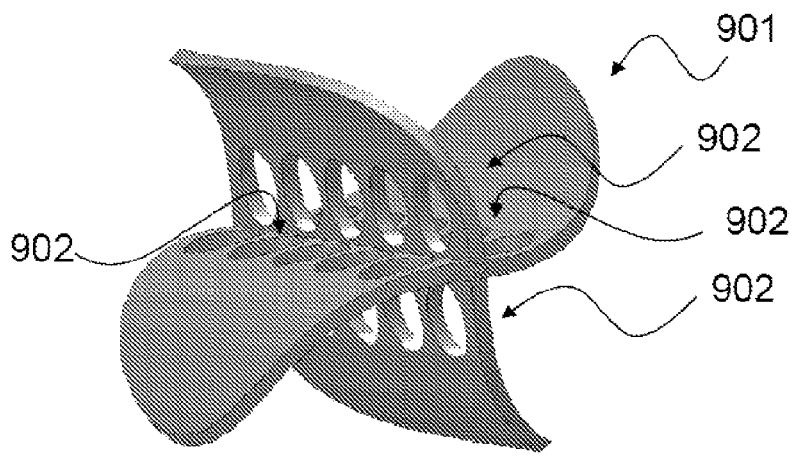
FIG. 9 shows a second embodiment of a rotor of a control valve according to the present invention.

FIG. 9 shows a further embodiment of a rotor 901 which may be used in a control valve according to the present invention. In this variant, the rotor 901 comprises four blades which, under the action of the fluid flowing through the valve, are adapted to rotate and produce a torque that drives the shaft 112.

The rotor 901 comprises a plurality of holes 902, which increase the flow coefficient due to a larger flow surface, although to detriment of the efficiency of the turbine.

The holes 902 are preferably located in the proximity of the axis of rotation of the rotor 902, so that the outermost portions of the blades, i.e. where the lever arm is longest, will still be working, thus producing more power.

A control valve according to the present invention may comprise a rotor made in accordance with different manufacturing solutions and with different shapes. which essentially depend on the type of application of the valve itself.

The embodiment of the rotor will primarily depend on the type of fluid for which the valve is to be optimized, whether gas, liquid, steam or any other multi-phase fluid.

This diversification is also dependent on the specific type of liquid involved, e.g. the viscosity or density thereof. For example, the valve will need different characteristics to operate with oil rather than water, such as a higher flow coefficient, so as to obtain a higher flow rate; also, the rotor blades will require self-cleaning capability.

Other variants of the rotor are also conceivable, which essentially differ from one another in the number of blades.

Figure 10:
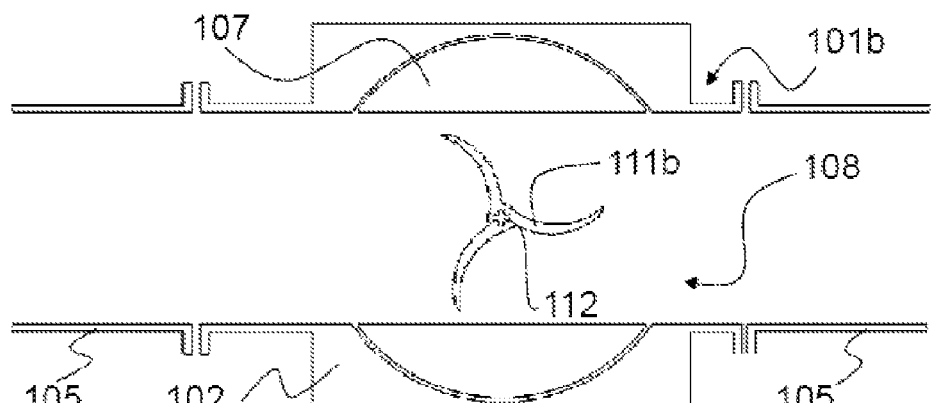
FIG. 10 schematically shows a sectional side view of a third embodiment of a control valve according to the present invention.

FIG. 10 schematically shows a valve 101b comprising a rotor 111b comprising three blades, which is preferably adapted for use with very viscous liquids.

Figure 11:
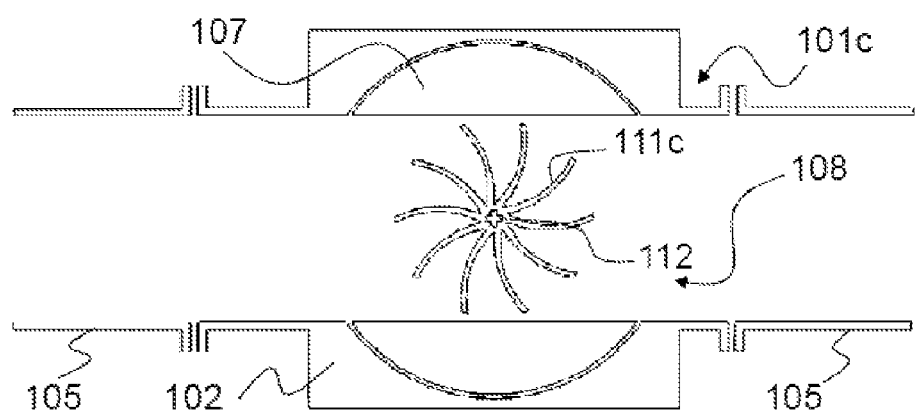
FIG. 11 schematically shows a sectional side view of a fourth embodiment of a control valve according to the present invention.

FIG. 11 schematically shows a valve 101c comprising a rotor 111c comprising ten blades, which is preferably adapted for use with gas.

In a preferred embodiment of the rotor blades, the blades are twisted axially relative to the valve, thus improving the rotor's efficiency. The blades may also be flat, e.g. should this choice be deemed appropriate in order to limit production costs.

A valve according to the present invention allows to recover energy, i.e. power, from the fluid flowing through the valve itself; the power thus obtained may be used for a plurality of different purposes.

Referring to the example shown in FIG. 1, and assuming that the rotor's energy is converted into electric energy, the data summarized in the following Tables I and II can be estimated by way of example.

| Tabella I - Table I | | | | | | | | |
|---|---|---|---|---|---|---|---|---|
| ∅ [inch] | α [°] | ρ [Kg/m³] | $C_v$ [—] | Q [l/s] | Δp [bar] | P [KW] | η [—] | $E_a$ [kWh] |
| 8" | 90° | 999.8 | 878 | 250 | 1.40 | 34.4 | 0.5 | 150851 |
| 8" | 50° | 999.8 | 291 | 120 | 2.95 | 34.7 | 0.5 | 151871 |
| 3" | 90° | 999.8 | 161 | 40 | 1.07 | 4.2 | 0.5 | 18376 |
| 3" | 50° | 999.8 | 57 | 25 | 3.33 | 8.2 | 0.5 | 35792 |

Table I shows an estimate of the power and energy that can be produced by a valve according to the present invention when used in a pressurized system in which a liquid, in particular water, flows. In the table, φ indicates a representative diameter of the valve; the angle α is the valve opening angle, which is 90° when the valve is fully open (spherical obstructer turned from the closed condition) or 50° when the valve is partially open; ρ is the density of water; $C_V$ is the estimated flow coefficient of the valve in said configuration; Q is the estimated volumetric flow through the valve; Δp is the pressure jump across the valve; P is the power dissipated across the valve; η is the estimated efficiency of the system (pessimistically assumed to be 0.5, inclusive of hydraulic, volumetric and mechanic losses, for an expected efficiency of approx. 0.85-0.95 of the hydraulic turbines); $E_a$ represents the energy that can be annually produced by the valve, assuming a 24 h duty cycle throughout the year (these conditions can be reasonably reached because of the inherent reliability and effectiveness of the valve according to the present invention). It follows from Table I that, for different apertures and sizes of a valve according to the present invention, and for the examples taken into account herein, the power that can be annually recovered is in excess of 150,000 KWh, with evident energetic advantages.

| Tabella II - Table II | | | | | | | | |
|---|---|---|---|---|---|---|---|---|
| ∅ [inch] | α [°] | ρ [Kg/m³] | $C_v$ [—] | Q [m³/s] | Δp [bar] | P [KW] | η [—] | $E_a$ [kWh] |
| 8" | 90° | 1.19 | 878 | 21.18 | 12.00 | 2.97 | 0.5 | 12997 |
| 8" | 50° | 1.19 | 291 | 7.02 | 12.00 | 0.98 | 0.5 | 4308 |
| 3" | 90° | 1.19 | 161 | 3.88 | 12.00 | 0.54 | 0.5 | 2383 |
| 3" | 50° | 1.19 | 57 | 1.38 | 12.00 | 0.19 | 0.5 | 844 |

Table II shows a second estimate of the power and energy that can be produced by a valve according to the present invention when used in a pressurized system in which a gas, in particular air, flows. In the table, φ indicates a representative diameter of the valve; the angle α is the valve opening angle, which is 90° when the valve is fully open (spherical obstructer turned from the closed condition) or 50° when the valve is partially open; ρ is the density of the gas; $C_V$ is the estimated flow coefficient of the valve in said configuration; Q is the estimated volumetric flow through the valve; Δp is the pressure jump across the valve (the present value of 12 bar corresponds to the average jump typically handled in methane gas distribution networks); P is the power dissipated across the valve; η is the estimated efficiency of the system (pessimistically assumed to be 0.5, inclusive of fluid-dynamic, volumetric and mechanic losses; $E_a$ represents the energy that can be annually produced by the valve, assuming a 24 h duty cycle throughout the year (these conditions can be reasonably reached because of the inherent reliability and effectiveness of the valve according to the present invention).

It follows from Table II that, for different apertures and sizes of a valve according to the present invention, and for the examples taken into account herein, even if the working fluid is an aeriform substance the power that can be annually recovered is in excess of 12,000 KWh, with evident energetic advantages.

It is apparent that many changes may be made to the present invention by those skilled in the art without departing from the protection scope thereof as stated in the appended claims.

For example, many embodiments are conceivable for a rotor of a valve according to the present invention, depending on whether it will have to prevalently operate in fully open or partially open conditions, with compressible or incompressible fluids; it is also possible to optimize the shape and construction of the various elements of the valve (diameter of the hole in the obstructer, etc.) based on the prevalent operating conditions of the valve itself.

It is also conceivable to position the actuator 109 on the same side of the valve 101 where the user apparatus 114 is located; this embodiment, though requiring a more complex construction (e.g. the actuator may require the presence of a hole through the shaft 112), may be used on the basis of considerations about the outer dimensions of the valve itself.

The invention claimed is:

1. A fluid flow control valve, comprising:
   a housing; and
   a spherical obstructer comprising:
      a through hole,
      wherein said spherical obstructer is inserted in said housing, and
      wherein said spherical obstructer is adapted to rotate therein about a first axis of rotation between a first position, in which said through hole is substantially coaxial to said control valve to allow the passage of a fluid, and a second position, in which said through hole is substantially transversal to said control valve to prevent the passage of the fluid, and
   wherein said control valve further comprises a rotor within said through hole,
      wherein said rotor comprises a shaft and a plurality of blades which are secured to said shaft,
      wherein said rotor is adapted to rotate in a continuous manner under the action of the fluid flowing through said control valve, said rotor rotating about said shaft having a second axis of rotation substantially coinciding with said first axis of rotation of said spherical obstructer.

2. The control valve according to claim 1, wherein said plurality of blades are substantially transversal to a flow of said passing fluid, and wherein said second axis of rotation of said shaft substantially coincides with said first axis of rotation.

3. The control valve according to claim 2, wherein said blades are twisted in a direction substantially parallel to the flow of said passing fluid.

4. The control valve according to claim 2, wherein said blades are sized such as to occupy, for some rotation positions of said rotor, substantially the whole free cross-section of said through hole of said spherical obstructer.

5. The control valve according to claim 2, wherein said blades comprise holes on their surface.

6. The control valve according to claim 2, wherein at least one end of said shaft protrudes from said spherical obstructer and is connected to a mechanical unit or to an electric generator.

7. The control valve according to claim 6, further comprising an actuator adapted to rotate said spherical obstructer, wherein said actuator is positioned on one side of said valve opposite to said mechanical unit or said electric generator along said first axis of rotation.

8. The control valve according to claim 1, further comprising a deflecting element positioned upstream of said rotor and adapted to fluid-dynamically interact with a flow of said passing fluid.

9. The control valve according to claim 8, wherein said deflecting element is positioned asymmetrically in said valve relative to said first axis of rotation.

10. The control valve according to claim 1, wherein said first axis of rotation is substantially transversal to said fluid flow through said valve.

11. The control valve according to claim 8, wherein the deflecting element has an aero-fluid-dynamic shape.

\* \* \* \* \*